United States Patent
Li et al.

(10) Patent No.: US 8,296,766 B2
(45) Date of Patent: Oct. 23, 2012

(54) START-UP TASK DISPATCHING FOR INSTANT MESSENGER APPLICATIONS

(75) Inventors: Xungeng Li, Shenzhen (CN); Xiaocong Liu, Shenzhen (CN); Bin Li, Shenzhen (CN)

(73) Assignee: Tencent Technology (Shenzhen) Company, Shenzhen (CN)

(*) Notice: Subject to any disclaimer, the term of this patent is extended or adjusted under 35 U.S.C. 154(b) by 154 days.

(21) Appl. No.: 12/827,857

(22) Filed: Jun. 30, 2010

(65) Prior Publication Data

US 2010/0269114 A1    Oct. 21, 2010

Related U.S. Application Data

(63) Continuation of application No. PCT/CN2009/071835, filed on May 18, 2009.

(30) Foreign Application Priority Data

Jun. 27, 2008  (CN) .......................... 2008 1 0127578

(51) Int. Cl.
  *G06F 9/44* (2006.01)
  *G06F 9/455* (2006.01)
(52) U.S. Cl. ........................................ 718/101; 718/102
(58) Field of Classification Search .................. None
  See application file for complete search history.

(56) References Cited

U.S. PATENT DOCUMENTS

| | | | | |
|---|---|---|---|---|
| 2004/0158831 A1* | 8/2004 | Amano et al. | ................. | 718/100 |
| 2005/0086030 A1* | 4/2005 | Zeidman | ........................... | 703/1 |
| 2005/0209804 A1* | 9/2005 | Basso et al. | ..................... | 702/79 |
| 2006/0190942 A1* | 8/2006 | Inoue et al. | ................... | 718/100 |
| 2007/0078855 A1* | 4/2007 | Manolov | ......................... | 707/10 |
| 2007/0121665 A1* | 5/2007 | Ergan et al. | ................... | 370/455 |
| 2007/0124363 A1* | 5/2007 | Lurie et al. | ..................... | 709/202 |

FOREIGN PATENT DOCUMENTS

| | | |
|---|---|---|
| CN | 1517867 A | 8/2004 |
| CN | 1794183 A | 6/2006 |
| CN | 101068222 A | 11/2007 |
| CN | 101296199 A | 10/2008 |
| JP | 9319596 A | 12/1997 |

OTHER PUBLICATIONS

"Startup Delayer 2.3 Documentation," R2 Studio, version 2.3 (2007). Chinese and English-language translation.
Labrosse, "Embedded Real Time Operation System μC/OS-II (Version 2)," Press of Beijing University of Aeronautics and Astronautics University, pp. 78-145 (2003).
English-language translation of First Office Action for Chinese Application No. 200810127576.8, dated Jan. 22, 2010.

* cited by examiner

*Primary Examiner* — Meng An
*Assistant Examiner* — Benjamin Wu
(74) *Attorney, Agent, or Firm* — Marshall, Gerstein & Borun LLP

(57) ABSTRACT

Embodiments of the present invention provide an Instant Messenger (IM) and a method for dispatching tasks by the IM. The method includes: presetting task information in a start-up program configuration table, and dispatching, by the IM, tasks in batches according to the task information in the start-up program configuration table. Preferably, the task information includes the execution delay information and priority information of the tasks. The IM includes a logging-on flow management module and a task dispatching management module. The logging-on flow management module is adapted to store the start-up program configuration table, which is configured with the task information. The task dispatching management module is adapted to dispatch the tasks in batches according to the task information in the start-up program configuration table. With embodiments of the invention, the start-up delay of the IM may be reduced.

11 Claims, 2 Drawing Sheets

START-UP TASK DISPATCHING FOR INSTANT MESSENGER APPLICATIONS

CROSS-REFERENCE TO RELATED APPLICATIONS

Figure 1:
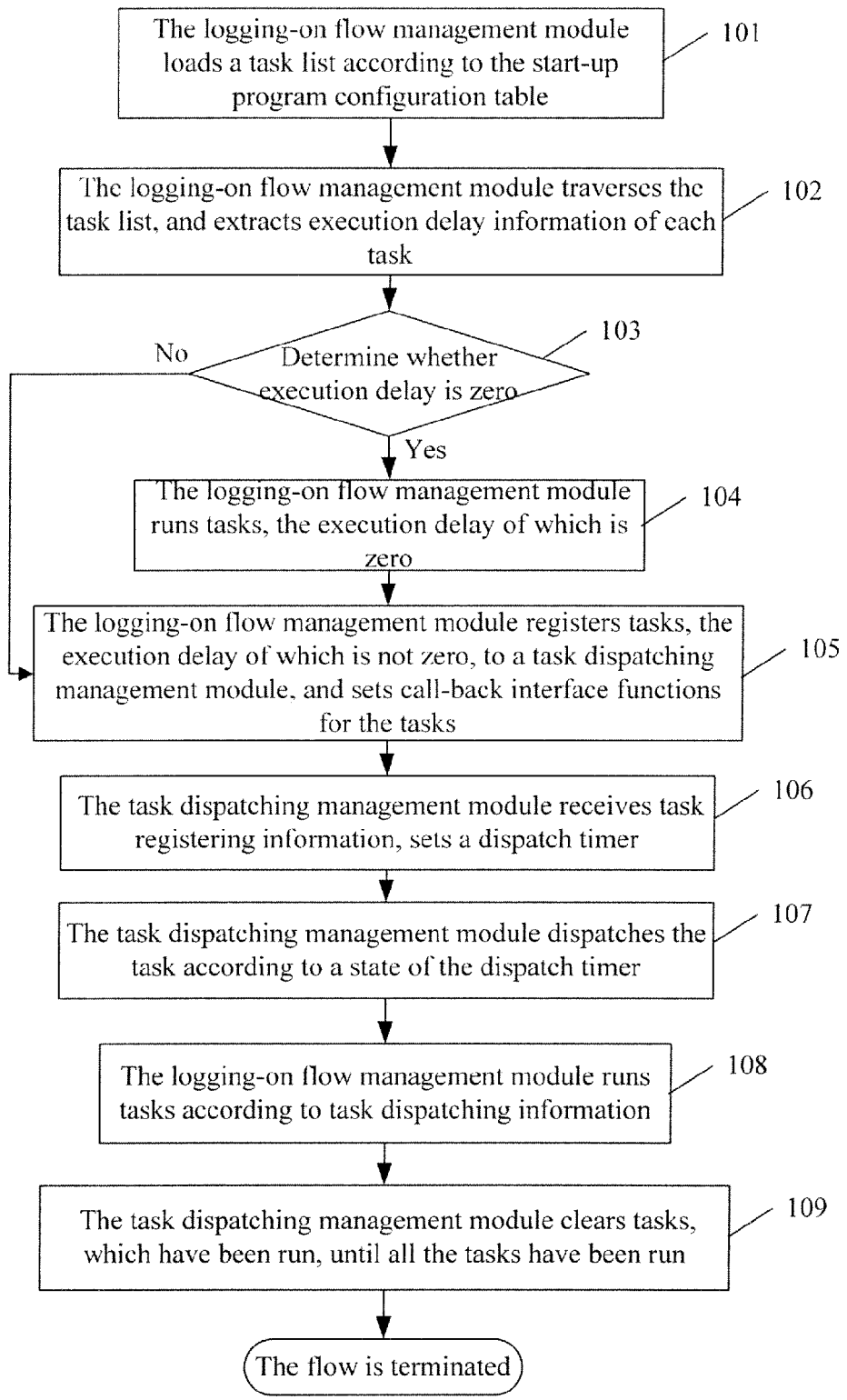

This is a continuation of International Application No. PCT/CN2009/071835 filed May 18, 2009, which in turn claims the priority benefit of Chinese Patent Application No. 200810127578.8 filed Jun. 27, 2008, the entire respective disclosures of which are incorporated herein by reference.

TECHNICAL FIELD

The invention relates to Instant Messaging technologies, and more particularly, to an Instant Messenger (IM) and a method for dispatching tasks with the IM.

BACKGROUND OF THE INVENTION

Have been developing until today, the network Instant Messenger (IM) has been accepted by most of network users and become an indispensable software tool of users. When using the IM, users pay much attention to time spent on the start-up of the IM. Only the IM which can quickly starts up may bring comfortable usage experience to the users. Thus, start-up performance has been continuously optimized by a lot of IM operators to meet higher usage requirements for the IM put forward by the users.

An IM includes multiple functional modules. Each functional module is used for executing multiple tasks. At present, during the start-up procedure, the IM uniformly dispatches task functions of each functional module. Thus, the dispatch is very difficult, and start-up delay of the IM is relatively long.

SUMMARY OF THE INVENTION

In view of above, embodiments of the present invention provide an Instant Messenger (IM) and a method for dispatching tasks with the IM, to reduce the start-up delay of the IM.

To achieve the above objectives, technical scheme provided by embodiments of the present invention is as follows.

A method for dispatching tasks by an Instant Messenger (IM), includes;

presetting task information in a start-up program configuration table, and dispatching, by the IM, tasks in batches according to the task information in the start-up program configuration table.

An Instant Messenger (IM), which includes a logging-on-flow management module and a task-dispatch management module.

The logging-on flow management module is adapted to store a start-up program configuration table, which is configured with task information; and the task dispatching management module is adapted to dispatch tasks in batches according to the task information in the start-up program configuration table.

It can be seen that, in the embodiments of the present invention, task information is preset in the start-up program configuration table, and the IM dispatches tasks in batches according to the task information in the start-up program configuration table. Preferably, the task information includes execution delay information and priority information. Since the start-up program configuration table has been set, and the start-up program configuration table not only includes the execution delay information of the task, but also includes the priority information of the task, execution delay information of different tasks is generally different, and priority information thereof generally is also different. Therefore, the IM may dispatch tasks in batches according to the execution delay information and priority information, to reduce the start-up delay of the IM.

BRIEF DESCRIPTIONS OF THE DRAWINGS

Figure 2:
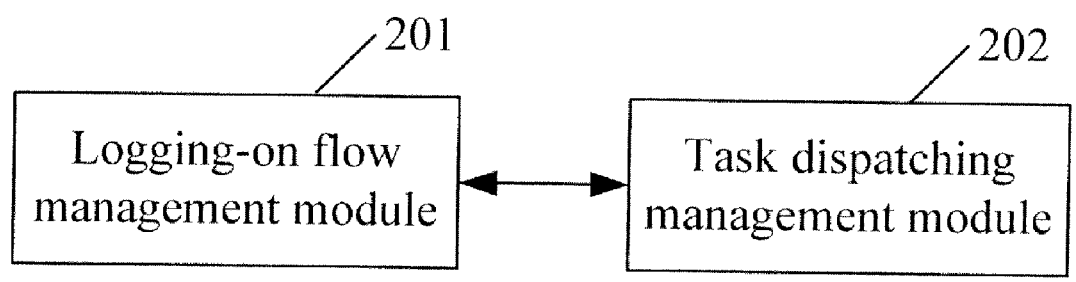

FIG. 1 is a flowchart illustrating a method for dispatching tasks with an Instant Messenger (IM) according to task information in a start-up program configuration table in accordance with an embodiment of the present invention; and FIG. 2 is a schematic diagram illustrating structure of an IM in accordance with an embodiment of the present invention.

EMBODIMENTS OF THE PRESENT INVENTION

In the embodiments of the present invention, task information has been preset in a start-up program configuration table. The IM dispatches tasks in batches according to the task information in the start-up program configuration table, and dispatches tasks in at least two batches.

To make objectives, technical solutions and advantages of the invention more apparent, the present invention is described in detail hereafter accompanying with figures and embodiments.

In the embodiments of the invention, a start-up program configuration table has stored task information of tasks of the IM. The task information includes at least one of: execution delay information, priority information, interface function of a task and task type, etc. The interface function of the task generally refers to a pointer of a task function. And a task may be executed through the interface function of the task. When the tasks are dispatched in batches according to the task information, the tasks may be dispatched in batches according to the delay information and priority information, or according to information, such as the task type, etc.

The task type generally includes four types, which are EO-ONLINE, EO-OFFLINE, EO_ONCE_ONLINE and EO_ONCE. The IM starts up a task of a corresponding type, according to each logging type. That is, tasks are dispatched in batches according to the task type. For example, the IM starts up a task of EO-OFFLINE, when logging on offline. After triggering the logging on operation, the IM dispatches a task with execution delay information after a time period designated by the execution delay information.

The task information in the start-up program configuration table may be stored in the form of a task list, in which different task list corresponds to different functional module of the IM. Structure of the task list is described hereafter with an example.

```
tagTaskInfo arTaskInfo[ ] =
{
    {&UpdateSelfInfo,         1000,   EO_ONLINE },
    {&UpdateContactList,      1000,   EO_ONCE_ONLINE},
    {&UpdateContactFolderList, 0,     EO_ONLINE},
    {&UpdateAllBuddyStatus,    0,     EO_ONLINE},
};
```

The task list includes four tasks. The first task is to update self information. The second task is to update a contact list. The third task is to update a contact folder list. The fourth task is to update all buddy status.

The second task is run only when the progress of the IM logs on for the first time. The other three tasks are executed each time the progress of the IM logs on or gets online normally. The first two tasks are dispatched with a 1000 ms delay after the progress of the IM begins to log on. The following two tasks are dispatched immediately when the progress of the IM begins to log on.

Sequence of the above four tasks demonstrates priority information of the tasks. The sequence of the task priority of the tasks from high to low is: the first task to the fourth task.

The task information in the start-up program configuration table may also be stored in the form of a database. Here, the above task list may be dynamically generated by the IM according to the task information in the start-up program configuration table, each time the IM starts up.

The method for dispatching tasks with the IM according to the task information in the start-up program configuration table is described hereafter in detail.

FIG. 1 is a flowchart illustrating a method for dispatching tasks with the IM according to task information in the start-up program configuration table in accordance with an embodiment of the invention. As shown in FIG. 1, the method includes the following processes.

Block 101: A logging-on flow management module loads a task list according to a start-up program configuration table.

In the block, when the task information in the start-up program configuration table is stored in the form of the task list, the IM directly loads the task list. When the task information in the start-up program configuration table is stored in the form of a database, the logging-on flow management module dynamically generates the task list according to the task information, and then loads the task list.

Block 102: The logging-on flow management module traverses the task list, and extracts execution delay information of each task.

Block 103: Determine whether the execution delay is zero. If the execution delay is zero, block 104 is performed; otherwise, block 105 is performed.

Block 104: The logging-on flow management module runs a task, the execution delay of which is zero.

Block 105: The logging-on flow management module registers a task, the execution delay of which is not zero, to a task dispatching management module, meanwhile sets a call-back interface function for the task.

Block 106: The task dispatching management module receives registering information of the task, and sets a dispatch timer.

In the block, the task-dispatch management module sets an Identity (ID) for the registered task, establishes a mapping relationship table for saving the mapping relationship between the ID of the task and task information of the task, and starts up a corresponding dispatch timer for the task. The dispatch timer is also identified with the ID of the task. Timing duration of the dispatch timer is the execution delay of the task. Each timer only runs for one time, and stops once timeout occurs.

Block 107: The task dispatching management module dispatches the task according to the state of the dispatch timer.

In the block, when the dispatch timer expires, the task dispatching management module queries for, according to the ID of currently expired dispatch timer, the task information in the mapping relationship established in block 105, sets a task state field of the task information as Ready, starts up an idle timer, and dispatches the task in the Ready state.

The task dispatching management module dispatches the task in the Ready state, during the timing period of the idle timer. The specific method is as follows. The task-dispatch management module traverses the mapping relationship table established in block 105, extracts the task state field of each piece of task information, determines whether the task state field is the Ready state, sets the task in the Ready state as a running state, and informs the logging-on flow management module to run the task in the running state through the call-back interface function.

Block 108: The logging-on flow management module runs the task according to task dispatch information.

In the block, the logging-on flow management module runs the task in the running state, and informs the task dispatching management module after finishing the running of the task. For example, the task dispatching management module may be informed through the call-back interface function.

Block 109: The task dispatching management module clears the task that has been run, until all the tasks are run and cleared. Then, the flow is terminated.

In the block, the task dispatching management module sets the state of the task that has been run as the NONE state, and clears the mapping relationship of the task in the NONE state in the mapping relationship table established in block 105. The task dispatching management module traverses the state of each task in the mapping relationship table, and starts up or restarts the idle timer as long as there is at least one task in the Ready state, until all the tasks are run.

A device embodiment applying the method illustrated in FIG. 1 is provided hereafter.

FIG. 2 is a schematic diagram illustrating structure of an IM in accordance with an embodiment of the invention. As shown in FIG. 2, the IM includes a logging-on flow management module 201 and a task dispatching management module 202.

The logging-on flow management module 201 is configured to store a start-up program configuration table, which is configured with execution delay information and priority information of tasks.

The task dispatching management module 202 is configured to dispatch tasks according to task information in the start-up program configuration table.

The logging-on flow management module 201 is further configured to traverse the execution delay information of the tasks in the start-up program configuration table, and registers tasks, the execution delay of which is not zero, to the task dispatching management module 202.

The task dispatching management module 202 is further configured to dispatch the tasks according to the execution delay information and the priority information of registered tasks.

From the above technical solution, it can be seen that in the embodiments of the present invention, the execution delay information and priority information of the tasks is preset in the start-up program configuration table, and the IM dispatches tasks according to the task information in the start-up program configuration table. The start-up program configuration table which not only includes the execution delay information of the tasks, but also includes the priority information of the tasks is set. Since the execution delay information of different tasks is generally different, and priority information of different tasks is generally also different, the IM may dispatch the tasks in batches according to the execution delay information and priority information, so that the start-up delay of the IM is reduced. For example, when starting up the IM, the execution delay of tasks that must be run is set as zero, while the execution delay of other tasks which may be run after the start-up of the IM can be set as nonzero, to reduce the start-up delay of the IM.

Moreover, when it is necessary to add new functional modules to the IM, developers only need to add task information, such as execution delay information, priority information, etc, of each task of the newly-added functional modules, to the start-up program configuration table. The management for start-up procedure of newly-added functional modules may be completed, which may not only improve the scalability of the IM, but also reduce workload of the developers for maintaining the start-up procedure of the IM.

The foregoing only describes preferred embodiments of the invention, which is not used for limiting the protection scope of the invention. Any modifications or substitutions within the technical scope disclosed by embodiments of the invention, and easily occurred to those skilled in the art, should be covered within the protection scope of the invention.

What is claimed is:

1. A computer-implemented method for dispatching tasks by an Instant Messenger (IM) after a user logs on the IM, comprising steps of:
   presetting and storing task information in a start-up program configuration table comprising a type information, an execution delay information and priority information associated with each IM task in a plurality of IM tasks, the type information comprises at least one of the following:
   a) EO-ONLINE, indicating the IM task is to be started when the user of the IM logs on the IM online, b) EO-OFFLINE indicating the IM task is to be started when the user logs on the IM offline, c) EO-ONCE-ONLINE indicating the IM task is to be started when the user logs on the IM for the first time, and d) EO-ONCE indicating the IM task is to be started when the user logs on the IM either online or offline;
   starting up the IM tasks corresponding to the user log on type and the type information of the IM tasks by dispatching the IM tasks according to the execution delay information and the priority information of each IM task, wherein dispatching the IM tasks further comprises of:
   traversing the execution delay information of the IM tasks stored the start-up program configuration table;
   registering, by a Logging-on Flow Management Module of the IM, each of the IM tasks with an execution delay which is not zero to a Task Dispatching Management Module; and
   assigning, by the Task Dispatching Management Module of the IM, an Identity (ID) for each registered IM task;
   establishing, by the Task Dispatching Management Module, a mapping relationship table storing a mapping relationship between the ID and the task information of each registered IM task;
   starting up, by the Task Dispatching Management Module, a dispatch timer for each of the IM tasks, by associating each dispatch timer with the ID of the IM task and setting the timing duration of the dispatch timer as the corresponding execution delay of the IM task; and
   dispatching the IM task according to the state of the dispatch timer and each IM task's priority information.

2. The method according to claim 1, wherein traversing the execution delay information of the IM tasks stored the start-up program configuration table further comprises:
   dispatching each of the IM tasks with an execution delay of zero according to each IM task's priority information in order of priority.

3. The method according to claim 1, further comprises the steps of:
   providing, by the Logging-on Flow Management Module, a call-back interface function;
   querying, by the Task Dispatching Management Module, the mapping relationship table storing the mapping relationship between the ID and the task information of the IM task when the dispatch timer expires;
   setting, by the Task Dispatching Management Module, a IM task state field within the IM task information corresponding to the ID of the dispatch timer as a Ready state;
   starting up an idle timer;
   traversing the mapping relationship table during the timing period of the idle timer;
   modifying the IM task state field in the Ready state to a Running state; and
   informing the Logging on Flow Management Module, using the call-back interface function, to dispatch the IM tasks in the Running state.

4. The method according to claim 3, wherein after dispatching the IM tasks in the Running state, the method further comprises:
   setting, by the Logging on Flow Management Module, the IM task state field of the IM task which has been dispatched to a NONE state, and
   clearing from the mapping relationship table, by Task Dispatching Management Module, stored information of the IM task in the NONE state.

5. The method according to claim 3, wherein dispatching, by the Logging on Flow Management Module, the IM tasks in the Running state comprises:
   dispatching, by the Logging on Flow Management Module, the IM tasks in the Running state in sequence, according to a descending order of priorities of the IM tasks in the Running state.

6. The method according to claim 1, further comprises of the step of:
   creating a new IM task in the IM by adding to the start-up program configuration table, the type information, the execution delay information and the priority information associated with the new IM task.

7. The method according to claim 1, wherein dispatching the IM task according to the state of the dispatch timer and each IM task's priority information further comprises of:
   dispatching the IM tasks in at least two batches according to the IM task information in the start-up program configuration table.

8. An Instant Messenger (IM) system, comprising a network computer including a processor coupled to a memory storing instructions, for execution by the processor, and further comprising a Logging on Flow Management Module and a Task Dispatching Management Module, wherein
   the Logging on Flow Management Module, when instructions are executed by the processor, performs the functions of: presetting and storing task information in a start-up program configuration table comprising a type information, an execution delay information and priority information associated with each IM task in a plurality of IM tasks, the type information comprises at least one of the following:
   a) EO-ONLINE, indicating the IM task is to be started when the user of the IM logs on the IM online, b) EO-OFFLINE indicating the IM task is to be started when the user logs on the IM offline, c) EO-ONCE-ONLINE indicating the IM task is to be started when the user logs on the IM for the first time, and d) EO-ONCE indicating the IM task is to be started when the user logs on the IM either online or offline;

starting up the IM tasks corresponding to the user log on type and the type information of the IM tasks by dispatching the IM tasks according to the execution delay information and the priority information of each IM task;

traversing the execution delay information of the IM tasks stored the start-up program configuration table; and registering each of the IM tasks with an execution delay which is not zero to a Task Dispatching Management Module; and wherein the Task Dispatching Management Module, when instructions are executed by the processor, performs the functions of:

assigning an Identity (ID) for each registered IM task;

establishing a mapping relationship table storing a mapping relationship between the ID and the task information of each registered IM task;

starting up a dispatch timer for each of the IM tasks, by associating each dispatch timer with the ID of the IM task and setting the timing duration of the dispatch timer as the corresponding execution delay of the IM task; and dispatching the IM task according to the state of the dispatch timer and each IM task's priority information.

9. The IM system of claim 8, wherein the IM system further comprises an idle timer, and wherein the Task Dispatching Management Module further performs the functions of:

querying the mapping relationship table storing the mapping relationship between the ID and the task information of the IM task when the dispatch timer expires;

setting a IM task state field within the IM task information corresponding to the ID of the dispatch timer as a Ready state;

starting up the idle timer;

traversing the mapping relationship table during the timing period of the idle timer;

modifying the IM task state field in the Ready state to a Running state; and informing the Logging on Flow Management Module, using a call-back interface function provided by the Logging-on Flow Management Module, to dispatch the IM tasks in the Running state.

10. The IM system of claim 8, wherein the Logging on Flow Management Module further performs the functions of:

creating a new IM task in the IM system by adding to the start-up program configuration table, the type information, the execution delay information and the priority information associated with the new IM task.

11. The IM system of claim 8, wherein dispatching the IM task according to the state of the dispatch timer and each IM task's priority information further comprises of:

dispatching the IM tasks in at least two batches according to the IM task information in the start-up program configuration table.

* * * * *